United States Patent [19]

Steiger et al.

[11] 4,311,786

[45] Jan. 19, 1982

[54] NOVEL SENSITIZERS AND THEIR USE IN DIRECT-POSITIVE PHOTOGRAPHIC MATERIALS

[75] Inventors: Rolf Steiger, Praroman; Jean F. Reber, Marly, both of Switzerland

[73] Assignee: Ciba-Geigy AG, Basel, Switzerland

[21] Appl. No.: 167,551

[22] Filed: Jul. 11, 1980

[30] Foreign Application Priority Data

Jul. 17, 1979 [CH] Switzerland .................. 6632/79
Oct. 19, 1979 [CH] Switzerland .................. 9418/79

[51] Int. Cl.$^3$ .................. G03C 5/24; G03C 1/36
[52] U.S. Cl. .................. 430/411; 430/574; 430/596; 430/597; 430/412; 542/434; 542/435; 542/436; 260/326.15; 260/239 R; 546/176; 546/121; 544/345; 548/156; 548/146; 548/219; 548/328; 430/573
[58] Field of Search .................. 430/573, 578, 596, 597, 430/598, 412, 574, 411; 542/434, 435, 436; 260/326.15, 239 R; 546/176, 121; 544/345; 548/156, 146, 219, 328

[56] References Cited

U.S. PATENT DOCUMENTS

Re. 29,930  3/1979  Illingsworth .................. 430/598
3,501,309  3/1970  Gilman et al. .................. 430/597

FOREIGN PATENT DOCUMENTS 549203  11/1942  United Kingdom .................. 430/578

*Primary Examiner*—Won H. Louie, Jr.
*Attorney, Agent, or Firm*—Sprung, Felfe, Horn, Lynch & Kramer

[57] ABSTRACT

Direct-positive photographic material which has at least one layer which contains a silver halide emulsion surface-fogged by chemical means or by exposure and, as a sensitizer, a trinuclear tetramethinecyanine dye in which all or some of the methine hydrogen atoms have been replaced by fluorine, chlorine, bromine or iodine atoms. The novel trinuclear tetramethinecyanine dyes impart an excellent blue-sensitivity to the photographic materials. Furthermore, high maximum densities and very low minimum densities are achieved.

14 Claims, No Drawings

NOVEL SENSITIZERS AND THEIR USE IN DIRECT-POSITIVE PHOTOGRAPHIC MATERIALS

The present invention relates to novel halogenated trinuclear cyanine dyes and their use as sensitisers in direct-positive photographic materials which contain, in at least one layer, a silver halide emulsion which has been surface-fogged by chemical means or by exposure.

It is known that fogged silver halide emulsions on the surface of which an electron acceptor has been adsorbed are suitable for the production of direct-positive photographic materials. Direct-positive emulsions of this type and the photographic materials produced therefrom have been disclosed in numerous patent publications, for example in U.S. Pat. Nos. 3,501,306, 3,501,307, 3,501,309, 3,501,310, 3,501,311, 3,501,312, 3,782,959, 3,804,632, 3,826,656, 3,923,524, 3,925,085, 3,933,505 and 3,933,506. However, as a rule emulsions of this type, and the photographic materials produced therefrom, have unsatisfactory sensitivities.

There has, therefore, been no lack of attempts to improve the sensitivity of such direct-positive systems.

Thus, for example, U.S. Pat. No. 3,583,870 describes the use of a sensitising mixture of bis-pyridinium salts and sensitiser dyes from the category of the methinecyanine and azacyanine dyes. Similar effects are also said to be achieved with the carbocyanines with one or two indolenine nuclei, which are described in U.S. Pat. No. 3,970,461. However, the effects achieved are not yet convincing in all respects.

U.S. Pat. No. 3,501,309 (Re. 28 258) describes the use of halogenation products of simple cyanines as sensitisers in surface-fogged direct-positive emulsions. However, these halogenated cyanines have the disadvantage of a very low storage stability.

The object of the present invention is to provide novel direct-positive silver halide emulsions which work in accordance with the principle of surface-fogging and, as a result of the use of novel sensitizers, have increased sensitivity, in particular increased characteristic or blue sensitivity.

The said object is achieved according to the invention by the use of novel halogenated trinuclear tetramethinecyanine dyes in direct-positive photographic materials.

The present invention therefore relates to a direct-positive photographic material which has at least one layer which contains a silver halide emulsion, which has been surface-fogged by chemical means or by exposure, and a sensitiser, wherein the sensitiser is a trinuclear tetramethinecyanine dye in which all or some of the methine hydrogen atoms have been replaced by fluorine, chlorine, bromine or iodine atoms.

The present invention also relates to the use of the photographic material for the production of direct-positive images, to a process for the production of direct-positive images by imagewise exposure and development of the direct-positive photographic material according to the invention and to the direct-positive images produced by this process and also to the novel halogenated trinuclear tetramethinecyanine dyes, processes for their preparation and their use in direct-positive photographic materials.

In this specification the term "halogenated trinuclear tetramethinecyanine dyes" is to be understood as meaning trinuclear tetramethinecyanine dyes which are wholly or partly halogen-substituted.

The halogenated trinuclear tetramethinecyanine dyes have, in particular, the formula

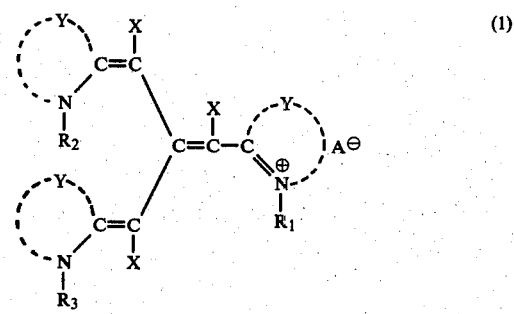

(1)

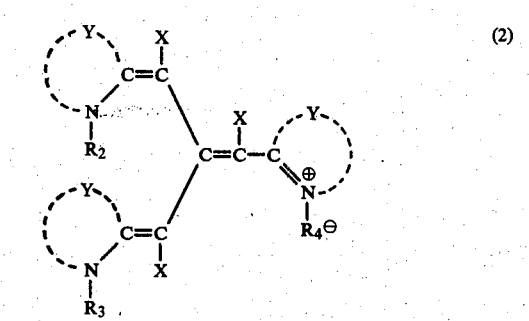

(2)

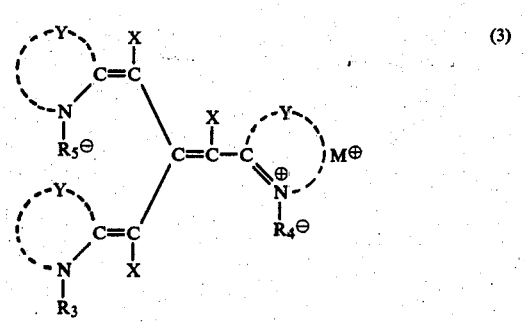

(3)

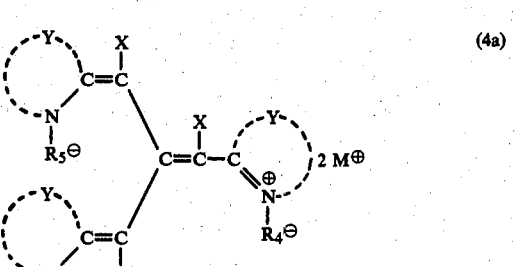

(4a)

or

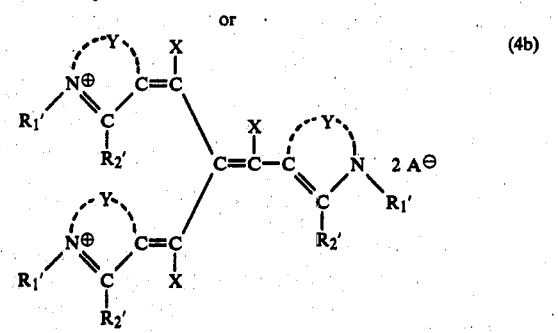

(4b)

in which Y is the atoms required to complete a monoheterocyclic or poly-heterocyclic, substituted or unsubstituted ring system, $R_1$, $R_2$ and $R_3$ are each alkyl having 1 to 20 carbon atoms or alkenyl having 2 to 20 carbon atoms, these radicals preferably having 1 to 4 (alkenyl 2 to 4) carbon atoms in the main chain and being unsubstituted or substituted by halogen, hydroxyl, cyano, alkoxy having 1 to 4 carbon atoms or carbalkoxy having 1 to 4 carbon atoms in the alkoxy radical, or aryl or aralkyl which are unsubstituted or substituted by halogen, hydroxyl, cyano, alkoxy having 1 to 4 carbon atoms, carbalkoxy having 1 to 4 carbon atoms in the alkoxy radical, alkyl, hydroxyalkyl or halogenoalkyl having 1 to 4 carbon atoms or mono- or di-alkylamino, amino, carboxamido or sulfonamido groups, $R_1'$ is alkyl having 1 to 4 carbon atoms, especially methyl or ethyl, $R_2'$ is aryl, especially phenyl, $R_4$, $R_5$ and $R_6$ are each alkyl of 1 to 20 or alkenyl of 2 to 20 carbon atoms, aryl, preferably phenyl, or aralkyl, preferably benzyl or phenylethyl, these radicals being substituted by a carboxyl or sulfo group, X is hydrogen, fluorine, chlorine, bromine or iodine, at least one substituent X being one of the said halogen atoms, $A^\ominus$ is a monovalent anion and $M^\oplus$ is a monovalent cation. The compounds are thus those which are mono-, di- or tri-halogenated (in the methine chain).

Preferred trinuclear tetramethinecyanine dyes are those of the formulae (1)–(4) in which all of the substituents X are one of the abovementioned halogen atoms.

Suitable substituents on the said alkyl or alkenyl radicals ($R_1$, $R_2$, $R_3$), which preferably contain 1 to 4 (alkenyl 2 to 4) carbon atoms, are, for example, halogen (fluorine, chlorine or bromine), hydroxyl, cyano, alkoxy having 1 to 4 carbon atoms or carbalkoxy having 1 to 4 carbon atoms in the alkoxy radical; suitable substituents on aryl and aralkyl, which in particular are phenyl or phenylethyl, are the same substituents and also alkyl, hydroxyalkyl or halogenalkyl, each having 1 to 4 carbon atoms, and —NH$_2$, —CONH$_2$ or —SO$_2$NH$_2$, which can also be substituted on the nitrogen atom by alkyl ($C_1$–$C_4$).

$R_4$, $R_5$ and $R_6$, which can be identical or different, are alkyl or alkenyl, aryl or aralkyl, which are substituted by carboxyl (COOH or COO$^\ominus$) or a sulfo group (SO$_3$H or —SO$_3^\ominus$), and in these radicals alkyl or alkenyl contain, for example, not more than 4 carbon atoms and aryl or aralkyl are preferably phenyl, benzyl or phenylethyl.

Preferred substituents $R_1$ to $R_3$ are methyl, ethyl, n-propyl, n-butyl, iso-butyl, allyl, β-methallyl, β-methoxyethyl, β-ethoxyethyl, β-hydroxyethyl, γ-hydroxypropyl, phenyl, benzyl or β-phenylethyl. Preferred substituents $R_4$ to $R_6$ are carboxymethyl, carboxyethyl, carboxypropyl, carboxybutyl, sulfoethyl, sulfopropyl, sulfobutyl, p-sulfobenzyl, carbomethoxymethyl, carbomethyoxyethyl, carboethoxymethyl or carboethoxyethyl.

Suitable monocyclic or polycyclic heterocyclic ring systems are, in particular, those with 1 to 4, preferably fused, rings, of which at least one ring is heterocyclic. Ring systems with 5-membered and/or 6-membered rings are preferred, for example 5-membered or 6-membered heterocyclic rings with substituted or unsubstituted benzene rings, which can be fused.

They can, optionally contain further substituents (in addition to $R_1$, $R_2$, $R_3$, $R_4$, $R_5$ and $R_6$), for example alkyl ($C_1$–$C_4$), especially methyl, aryl, especially phenyl, or halogenoalkyl ($C_1$–$C_4$), especially trifluoromethyl.

Preferred heterocyclic ring systems are indicated by the formulae given below. For reasons of simplicity, only one mesomeric structure is indicated in each case. R has the meanings defined for $R_1$ to $R_6$ and Z is fluorine, chlorine, bromine or methoxy.

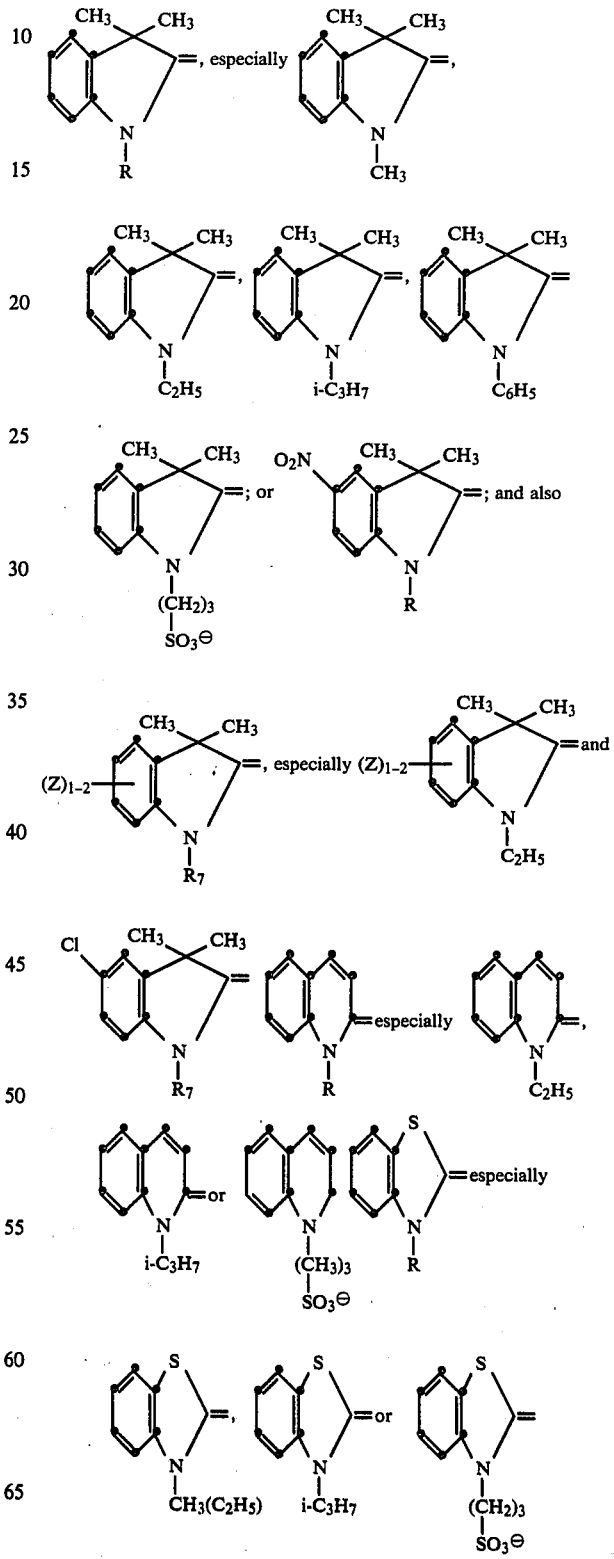

-continued
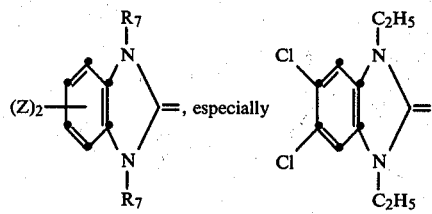, especially
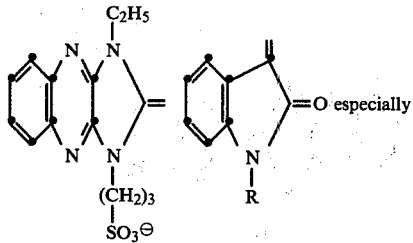
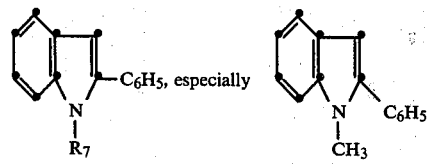, especially
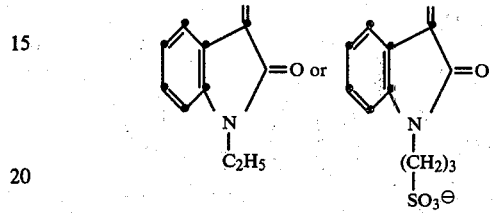
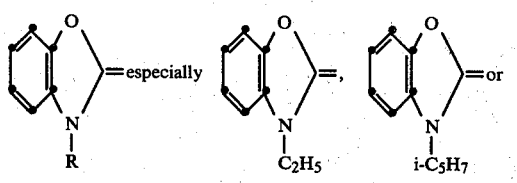
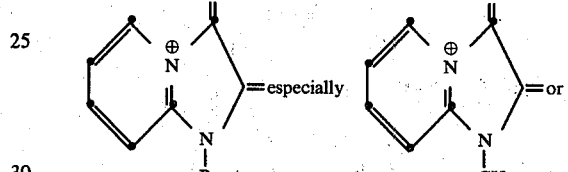, especially
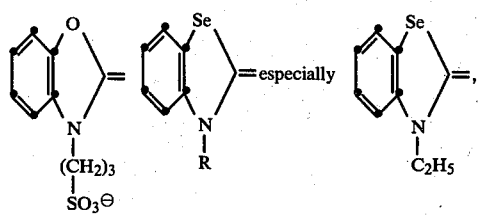
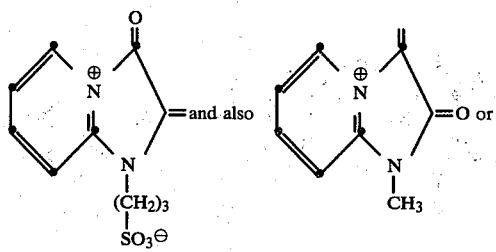 and also
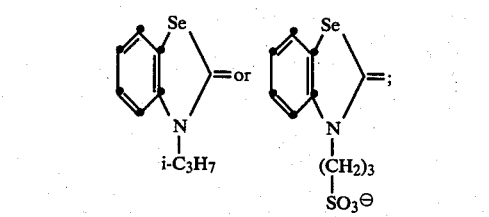
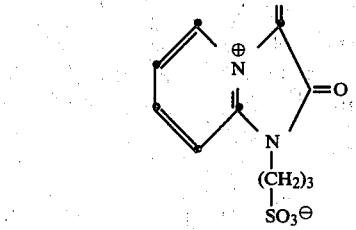
Further suitable heterocyclic radicals have the following formulae:
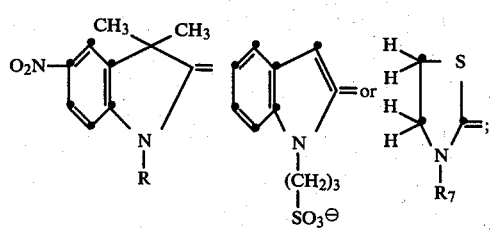
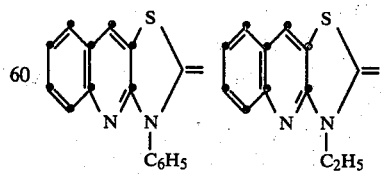
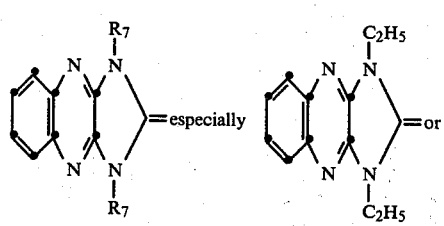
($R_7$ = alkyl having 1 to 4 carbon atoms)

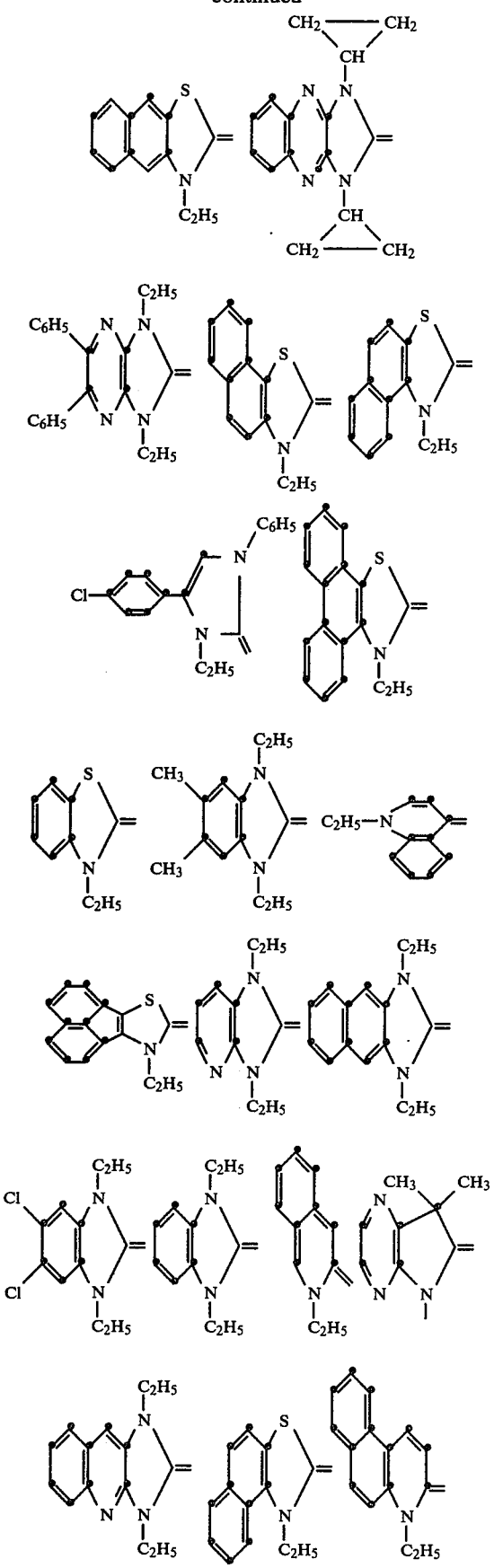
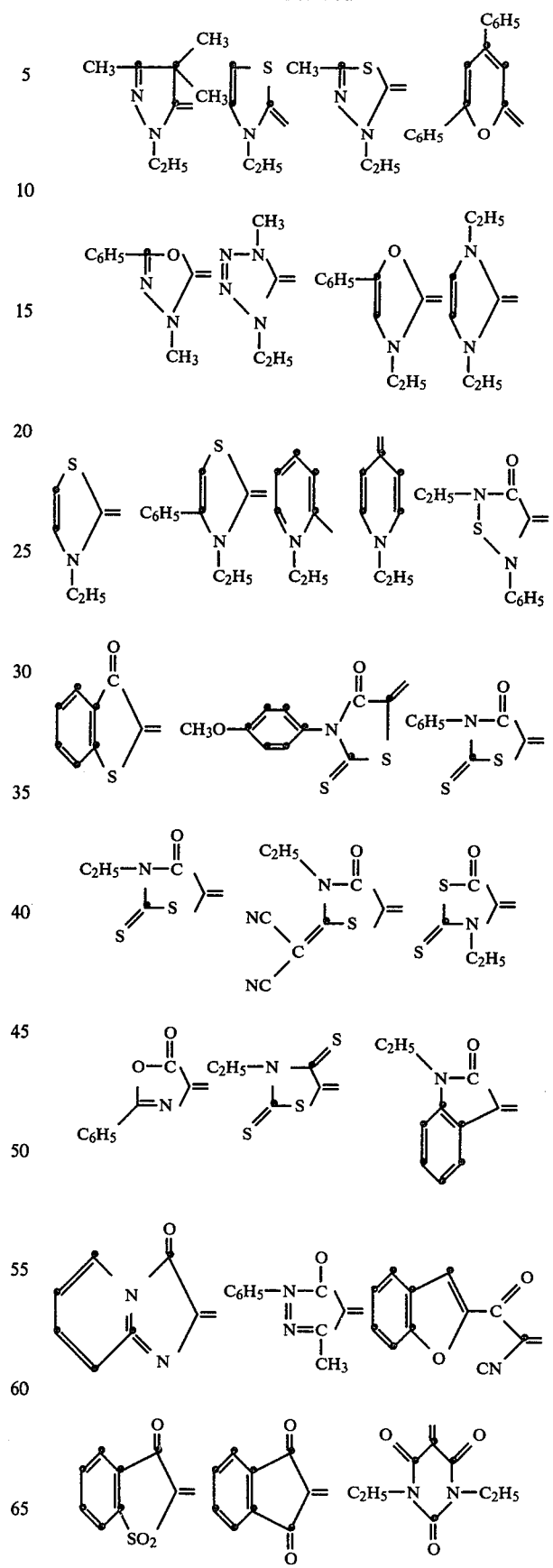

-continued

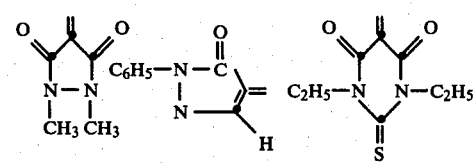

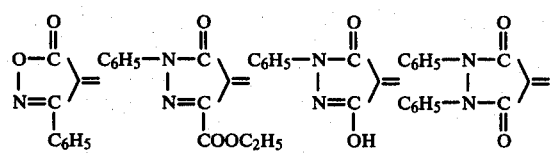

The abovementioned heterocyclic radicals which have betaine structures, for example $-(CH_2)_n COO^{\ominus}-$ or $-(CH_2)_n SO_3^{\ominus}-$ substituents on a nitrogen atom, are also suitable (n=1–4).

The heterocyclic compounds suitable for the preparation of cyanine dyes are known, for example, from D. M. Sturmer, Synthesis and Properties of Cyanine and Related Dyes in Chemistry of Heterocyclic Compounds, Vol. 30 (1977), edited by A. Weissberger and E. C. Taylor.

Particularly preferred halogenated trinuclear tetramethinecyanine dyes have the formulae (5)
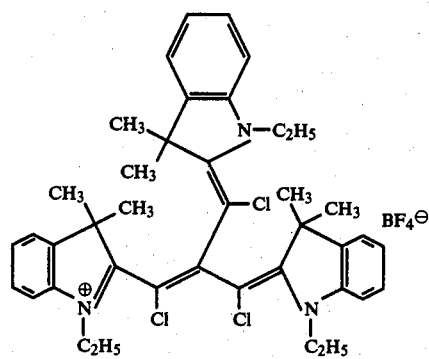

(6)
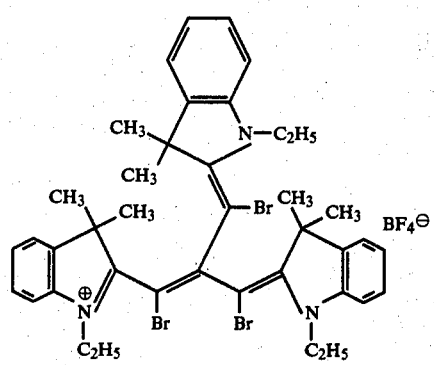

(7)
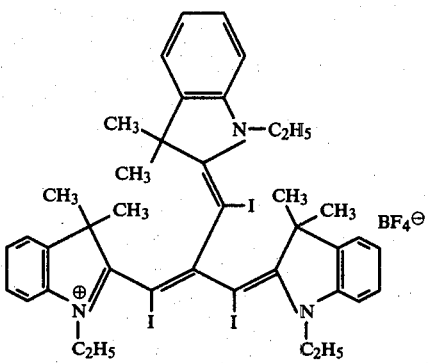

(8)
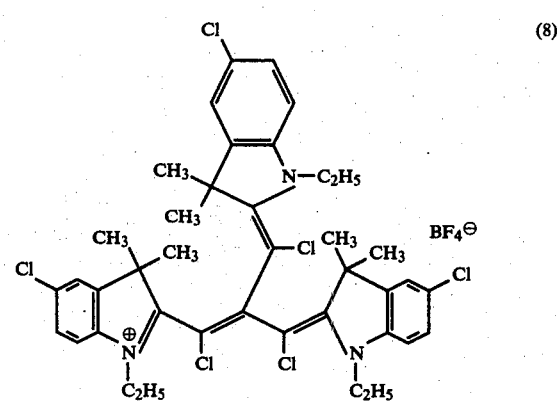

(9)
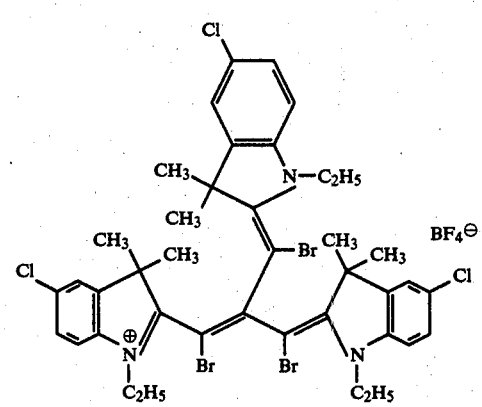

(10)
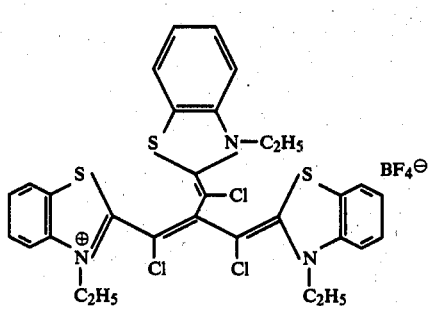

and also the tribromo compound analogous to formula (10);

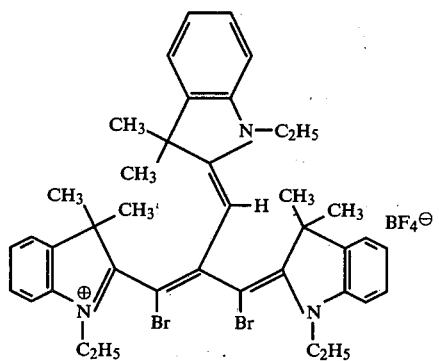 (11)

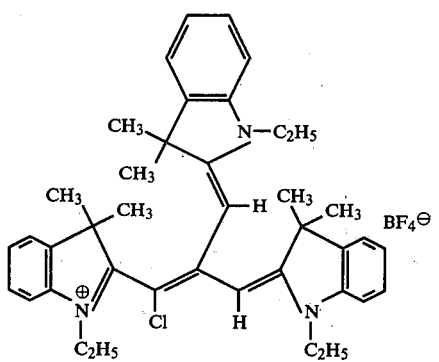 (12)

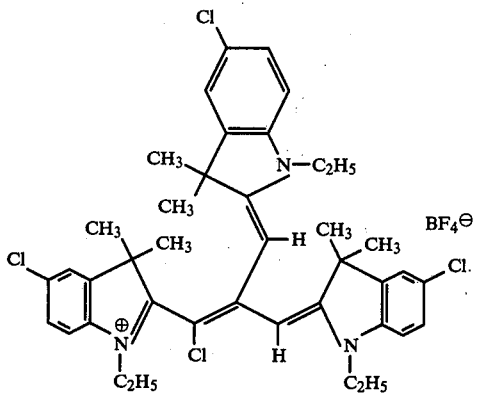 (13)

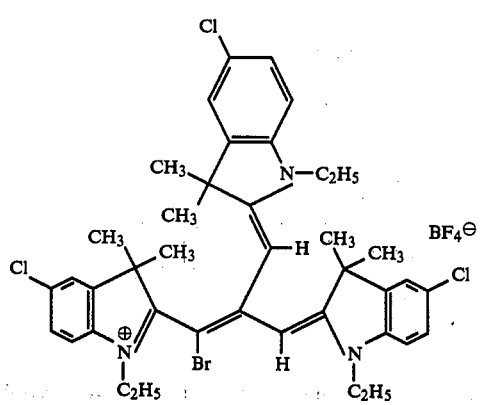 (14)

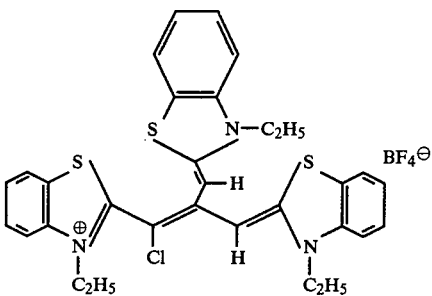 (15)

and

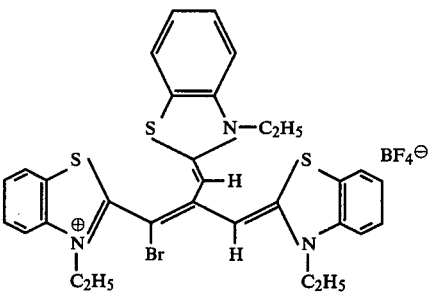 (16)

and also the compounds of the formulae

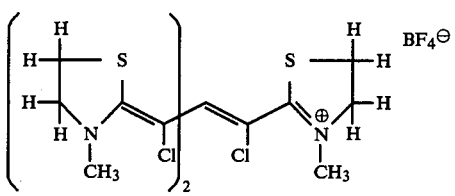 (17)

and the corresponding bromine compound; and

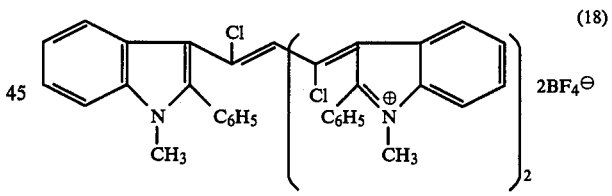 (18)

and the corresponding bromine compound.

Suitable anions $A^\ominus$ in the compounds of the formula (1) are, in particular, the halides, such as chloride, bromide or iodide, and also nitrate, tetrafluoborate, perchlorate, thiocyanate and p-toluenesulfonate and also bisulfate.

The monovalent cations ($M^\oplus$ in the compounds of the formulae (3) and (4) are, for example, hydrogen, alkali metals (sodium or potassium), ammonium or, optionally, substituted ammonium.

The synthesis and properties of trinuclear, but not halogenated, cyanine dyes are described in C. Reichhardt and W. Mormann, Chem. Ber. 105, 1815 (1972); C. Reichhardt and K. Halbritter, Chem. Ber. 104, 822 (1971); F. Baer and H. Oehling, Org. Magnet. Resonance 6, 421 (1974); A. v. Dorme al, Chimie et Industrie 67, 368 (1952), in the U.S. Pat. No. 2,282,115 and the GB Pat. Nos. 549,202 and 549,203.

The halogenated trinuclear tetramethinecyanine dyes according to the invention are obtained from known cyanine dyes by halogenation with conventional halogenating agents. Suitable halogenating agents, which are employed in alcohol solutions (methanol or ethanol, which can be aqueous, are, for example, N-chlorosuccinimide, N-bromosuccinimide, N-iodosuccinimide or halogen/pyrrolidone complexes; and also N-chlorobenztriazole and iodine chloride.

The sensitivity of the direct-positive photographic materials according to the invention can be further increased by using, in addition to the said halogenated trinuclear tetramethinecyanines, yet further conventional sensitising dyes, other than the halogenated trinuclear cyanines, in the photographic materials. Dyes which are suitable as further sensitising dyes are, for example, the conventional mono- or poly-methine dyes, such as acid or basic cyanines, hemicyanines, streptocyanines, merocyanines, oxonoles, hemioxonoles or styryl dyes. Sensitisers of this type are described, for example by F. M. Hamer in "The Cyanine Dyes and Related Compounds" (1964), Interscience Publishers John Wiley and Sons.

Preferred cyanine dyes are acid or basic, as a rule bi-nuclear, symmetrical cyanine dyes, which contain substituted or unsubstituted benzimidazole, benzoxazole, benzthiazole, benzselenazole, indole and/or quinoline radicals. Substituents on these heterocyclic radicals can be alkyl having 1 to 18 carbon atoms, halogen, especially chlorine and bromine, amino, alkylamino having 1 to 4 carbon atoms, alkoxyalkyl having 1 to 4 carbon atoms in the alkyl moiety and the alkoxy moiety, halogenoalkyl having 1 to 4 carbon atoms, for example trifluoromethyl, nitro, aryl, especially phenyl, carboxyalkyl having 1 to 4 carbon atoms in the alkyl moiety and sulfoalkyl having 1 to 4 carbon atoms in the alkyl moiety. The following are specific cyanine dyes which are suitable as additional sensitising dyes:

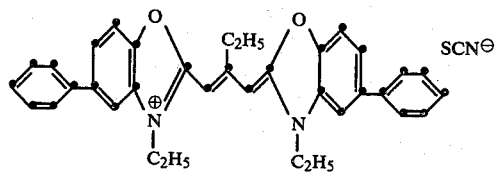
(19)

Absorption maximum in the emulsion: 555 nm (aggregated, J-band)

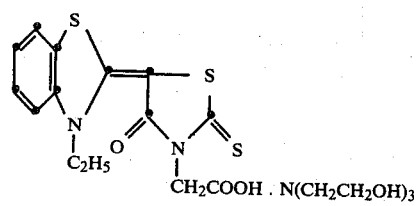
(20)

Absorption maximum in the emulsion: 465 nm (monomer)

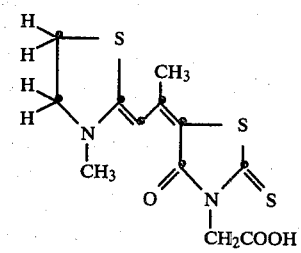
(21)

Absorption maximum in the emulsion: 535 nm

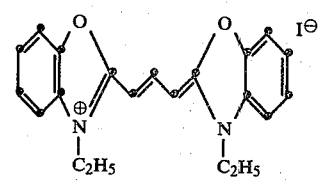
(22)

Absorption maximum in the emulsion: 515 nm

The particular advantages of the direct-positive emulsions according to the invention and of the halogenated trinuclear tetramethinecyanine dyes used to prepare these emulsions are:

1. The sensitised emulsions have little characteristic colour.
2. The halogenated trinuclear tetramethinecyanine dyes can be used direct as positively acting sensitising dyes in emulsions containing fogged silver halide crystals.
3. The halogenated trinuclear tetramethinecyanine dyes are readily compatible with other spectral sensitising dyes, normal sensitisation in the characteristic range of the additional sensitising dye being obtained.
4. Excellent photographic characteristics, in particular a high maximum density and an infinitesimally low minimum density.
5. High stability (chemical stability or stability in the dark) of the halogenated trinuclear tetramethinecyanine dyes according to the invention, compared with known halogenated dinuclear cyanine dyes (U.S. Pat. No. 3,501,309).
6. Increased blue or characteristic sensitivity of the cyanine dyes according to the invention, compared with trinuclear cyanine dyes which have not been halogenated.

The emulsions which can be used for the invention are the conventional photographic emulsions consisting of silver chloride, silver bromide or silver iodide as well as mixtures of these halides; the proportions of the different halides can vary within wide limits. Suitable emulsions are described, for example, in U.S. Pat. Nos. 3,501,305, 3,501,306, 3,531,288 and 3,501,290. In addition, vapour-deposited layers of silver halide on suitable supports can also be processed according to the invention to give direct-positive materials.

The surface-fogging of the silver halide can be effected, for example, by exposure or by chemical means using the conventional fogging agents, for example using reducing agents, such as sodium formaldehydesulfoxylate, hydrazine, tin-II salts or thiourea dioxide. It is particularly advantageous to use, at the same time, a reducing agent together with a metal which is more noble than silver, for example rhodium, gold and the like, as is described, for example, in T. H. James "The Theory of the Photographic Process", page 189, 4th edition, 1977, or in U.S. Pat. No. 3,501,307.

In order to produce photographic materials, the fogged emulsions provided, according to the invention, with a halogenated trinuclear tetramethinecyanine dye and also, optionally with spectral sensitising dyes, are coated in a thin layer onto a suitable substrate made of glass, paper or plastic, it being possible to add further conventional assistants, for example stabilisers, wetting agents, hardeners, plasticisers, hydrophilic colloids and dispersions of polymers, in order to facilitate coating and/or to impart the desired physical characteristics to the photographic layers. In addition to the light-sensitive layer or layers, the photographic materials can also contain further layers, such as protective layers, filter layers, antihalation layers and further layers containing further constituents which have an effect on the image, such as colour couplers or bleachable dyes.

In the following examples, parts and percentages are by weight, unless stated otherwise.

PREPARATION EXAMPLES

Example 1

Dye of the formula (5)

0.65 g (1 mmol) of the compound of the formula

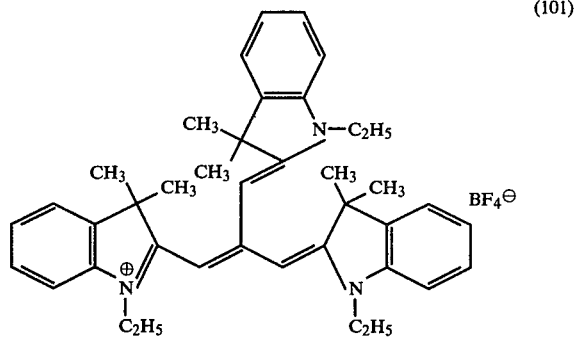

(101)

Preparation by the method of C. Reichhardt and W. Mormann, Chem. Ber. 105, 1815 (1972) (Lit. a)

is dissolved in 100 ml of methanol at 40° C. After cooling to room temperature, a solution of 0.51 g (3.3 mmols) of N-chlorobenztriazole in 20 ml of methanol, corresponding to an excess of 10%, is added dropwise. The solution is stirred at room temperature for one hour and is then evaporated using a rotary evaporator. The blue residue is dissolved in 50 ml of acetone at 20° C. After adding 10 g of NaBF$_4$, dissolved in 20 ml of water, the dye of the formula (5) precipitates out. The mixture is cooled to 0° C. and the dye is filtered off in vacuo and washed on the filter with twice-distilled water. It is dried at 70° C.; it is then dissolved once again in acetone and the precipitation with NaBF$_4$ is repeated.

The dye of the formula (5) is obtained in a yield of 95%, based on the starting material of the formula (101). Absorption maximum in methanol: $\lambda$max=627 nm, $\epsilon=3.04\times10^4$ 1 mol$^{-1}$cm$^{-1}$. Further characterisation by absorption spectroscopy (UV, visible region and IR), elementary analysis and the thin layer chromatogram.

Example 2

Dye of the formula (6)

2.15 g (3.3 mmols) of the compound of the formula (101) are dissolved in 200 ml of methanol. A solution of 1.8 g (10 mmols) of N-bromo-succinimide in 50 ml of acetone is then added dropwise in the course of 30 minutes, at room temperature, with stirring. The reaction mixture is stirred for a further one hour at room temperature and a further solution of 0.18 g of N-bromosuccinimide in 5 ml of acetone is added (total excess 10%). The resulting mixture is stirred for a further 10 minutes and is then evaporated to dryness using a rotary evaporator. The blue residue is taken up in 30 ml of warm acetone.

After adding 15 g of NaBF$_4$, dissolved in 20 ml of twice-distilled water, the dye of the formula (6) precipitates out. The mixture is cooled to 0° C. and the dye is filtered off. The filter residue is washed with twice-distilled water and dried at 70° C. and is again dissolved in acetone. Precipitation with NaBF$_4$ is repeated once. Finally, after drying again, 2.90 g of the dye of the formula (6) are obtained, corresponding to a yield of 97%.

Absorption maximum in methanol: $\lambda$max=644 nm, $\epsilon=1.62\times10^4$ 1 mol$^{-1}$cm$^{-1}$. Further characterisation of the dye of the formula (6) by absorption spectroscopy, and determination of bromine by X-ray fluorometry, elementary analysis and thin layer chromatography.

The dye of the formula (9) is also prepared analogously.

The dyes of the following formula

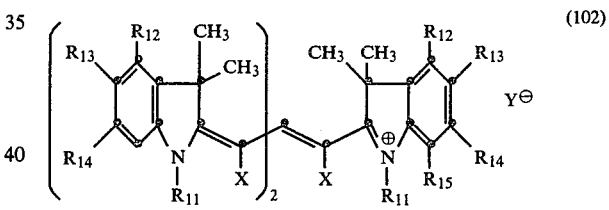

(102)

are also prepared using methods analogous to those for the preparation of the tetramethinecyanine dyes of the formulae (5) and (6).

TABLE I

| R$_{11}$ | R$_{12}$ | R$_{13}$ | R$_{14}$ | R$_{15}$ | Y$^\ominus$ | X |
|---|---|---|---|---|---|---|
| C$_2$H$_5$ | H | H | H | H | BF$_4$ | Cl, Br |
| CH$_3$ | H | H | H | H | BF$_4$ | Cl, Br |
| CH$_3$ | H | H | H | H | ClO$_4$ | Cl, Br |
| C$_2$H$_5$ | H | Cl | H | H | BF$_4$ | Cl, Br |
| C$_2$H$_5$ | H | H | H | Cl | BF$_4$ | Cl, Br |
| CH$_3$ | H | F | H | H | BF$_4$ | Cl, Br |
| C$_2$H$_5$ | H | F | H | H | BF$_4$ | Cl, Br |
| C$_2$H$_5$ | H | Br | H | H | BF$_4$ | Cl, Br |
| C$_2$H$_5$ | H | CH$_3$O | H | H | BF$_4$ | Cl, Br |
| CH$_3$ | Cl | H | Cl | H | BF$_4$ | Cl, Br |
| CH$_3$ | Cl | H | H | Cl | BF$_4$ | Cl, Br |
| CH$_3$ | H | Cl | H | Cl | BF$_4$ | Cl, Br |

Example 3

Dye of the formula (7)

473.5 mg of the compound of the formula (101) are dissolved in 100 ml of methanol at room temperature and are then reacted for one hour, with stirring, with a solution of 386 mg of iodine chloride in methanol, corresponding to an excess of 10%. After evaporating in a rotary evaporator, a blue residue is obtained and this is dissolved in 50 ml of acetone at 50° C. and, after cooling to room temperature, this solution is treated with a solution of 10 g of NaBF₄ in 20 ml of twice-distilled water. The reaction mixture is cooled to 0° C.; the dye of the formula (7), which has precipitated, is filtered off with suction and washed with twice-distilled water and, as in the preceding examples, the dissolving and precipitation steps are repeated once more. After drying, the dye of the formula (7) is obtained in a yield of 80%.

Absorption maximum $\lambda$max=606 nm (in methanol), $\epsilon=3.24\times10^4$ 1 mol$^{-1}$cm$^{-1}$. Further characterisation of the dye of the formula (7) by absorption spectroscopy (UV, visible region and IR), elementary analysis and thin layer chromatography.

Example 4

Dye of the formula (8)

200 mg of the compound of the formula (103) (synthesis in accordance with Lit. a))

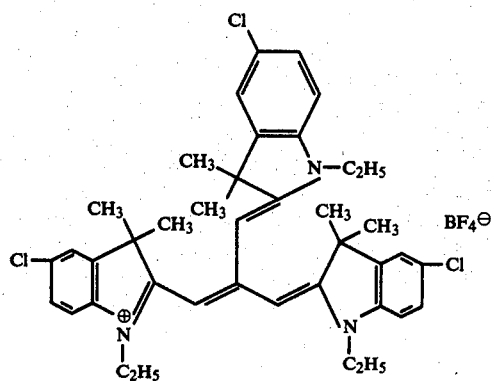

(103)

are dissolved in 200 ml of methanol at 60° C. After cooling to room temperature, a solution of 150 mg of N-chlorobenztriazole in 20 ml of methanol, corresponding to an excess of 10%, is added dropwise. The mixture is stirred for a further one hour at room temperature and is then evaporated to dryness using a rotary evaporator and, as described in the preceding examples, the residue is then repeatedly taken up in acetone, precipitated using NaBF₄, filtered off and washed with twice-distilled water. The dye of the formula (8) is obtained in a yield of 90% of theory.

Absorption maximum in methanol: $\lambda$max=635 nm, $\epsilon=2.40\times10^4$ 1 mol$^{-1}$cm$^{-1}$. Further characterisation by absorption spectroscopy (UV, visible region and IR), and elementary analysis. The purity was confirmed by thin layer chromatography.

Example 5

Compound of the formula (10)

(a) A suspension of 5.0 g of 3-ethyl-2-methyl-benzthiazolium iodide, 1.2 g of tris-(methylthio)-methyltetrafluoborate, prepared in accordance with Tetrahedron Lett. 1967, 2747, and 3.2 g of triethylamine in 30 ml of absolute acetonitrile is heated at 100° C. in a sealed tube for 4 hours. After cooling, the reaction mixture is diluted with 400 ml of diethyl ether; the precipitate is filtered off with suction and then subjected to chromatography through a column containing 150 g of silica gel. (Solvent system: chloroform/isopropanol 15:5 v/v). The compound of the formula

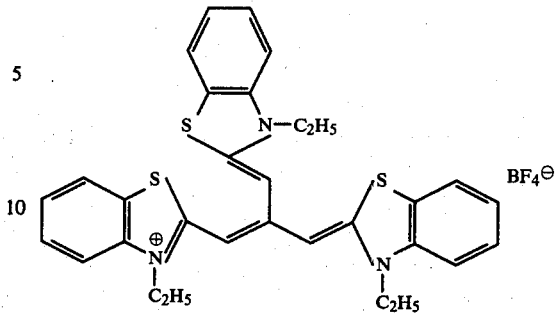

(104)

is obtained in the form of small dark green leaves with a metallic gloss.

Absorption maximum in methanol: $\lambda$max=556 nm. Further characterisation by $^1$H-NMR and elementary analysis.

(b) The reaction of the compound of the formula (104) with chlorobenztriazole to give the dye of the formula (10) is effected under conditions identical to those indicated in Example 1.

The yield is 80%. Purification is effected by dissolving the product in acetone and precipitating with diethyl ether and then filtering off.

Absorption maximum in methanol: $\lambda$max=632 nm, $\epsilon=4.2\times10^4$ 1 mol$^{-1}$cm$^{-1}$. Further characterisation by absorption spectroscopy (UV, visible region and IR), and elementary analysis. The purity is checked by thin layer chromatography.

Compounds of the formula (10) which contain ClO₄$^\ominus$ and methylsulphate CH₃SO₄$^\ominus$ as the anions are prepared analogously, as are also those compounds which are brominated in the methine chain or are substituted on the nitrogen atom by methyl.

Example 6

Dye of the formula (16)

630 mg (1 mmol) of the compound of the formula (101) are dissolved in 50 ml of methanol at 60° C. After cooling to room temperature, a solution of 178 mg (1 mmol) of n-bromosuccinimide in 20 ml of methanol is added dropwise. The solution is stirred at 20° C. for half an hour and is then concentrated to dryness using a rotary evaporator. The residue is then separated by chromatography through a column containing silica gel (solvent system: chloroform/methanol in a ratio of 9:1). The compound of the formula

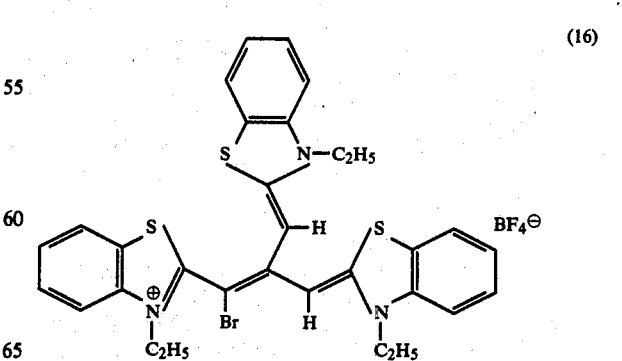

(16)

is obtained in the form of blue crystals.

Absorption maximum: $\lambda_{max}$=589 nm (in methanol).

Further characterisation of the dye of the formula (16) by elementary analysis and by the determination of bromine by X-ray fluorescence.

USE EXAMPLES

Example 7

A direct-positive emulsion, the mode of action of which is based on the principle of the bleaching of a surface fog, is prepared by subjecting a cubic-monodisperse silver iodide-bromide emulsion in gelatine, the iodide content of which is 1.6 mol % and the average edge length of the cubic crystals being 0.28 μm, to chemical fogging at a temperature of 60° C. for 100 minutes. 7 ml of a 0.01% solution of sodium formaldehyde-sulfoxylate and 14 ml of a 0.01% solution of auric chloride acid ($HAuCl_4$) per mol of silver halide present in the emulsion are used as the fogging agent. A pH value of 8.8 and a pAg value of 6.5 are maintained during the fogging operation.

The emulsion is then divided into three portions and each portion is treated with a solution of the chlorinated trinuclear cyanine dye of the formula (5). 400, 467 and 533 mg respectively of the dye of the formula (5), per mol of silver halide, are used in the three portions of the emulsion. The emulsions are then adjusted to a pH value of 6.0 and a pAg value of 9.3 and finally are each coated onto a polyester substrate to give a thin uniform film, and the films are dried. The thickness of the layer is so chosen that one square meter of the layer contains 3.2 g of silver and 4.5 g of gelatine.

A sample of each coated material is exposed behind a step wedge in a sensitometer with a conventional tungsten incandescent bulb and is developed with a developer of the following composition:

| | |
|---|---|
| N-methyl-p-aminophenol sulfate | 2.0 g |
| anhydrous sodium sulfite | 75.0 g |
| hydroquinone | 8.0 g |
| anhydrous sodium carbonate | 37.5 g |
| potassium bromide | 2.0 g |
| water to make up to | 3 liters |

Evaluation of the exposed and developed step wedge gives the following sensitometric values:

TABLE II

| Experiment No. | Cyanine dye of the formula (5) (mg/mol of silver halide) | Sensitivity ($S_{50}$)* | Contrast ($\gamma$) | $D_{max}$ | $D_{min}$ |
|---|---|---|---|---|---|
| 2.1 | 400 | 1.69 | 2.4 | 3.28 | 0.02 |
| 2.2 | 467 | 1.75 | 2.2 | 3.08 | 0.02 |
| 2.3 | 533 | 1.80 | 1.9 | 2.92 | 0.02 |

Spectral sensitivity range up to 510 nm
*In Lux. seconds at 50% of the maximum density, $S_{50} = 3 - \log E$ (E measured in Lux. seconds).

The data show that an excellent blue-sensitivity of the direct-positive image with very low minimum densities is obtained.

Example 8

Direct-positive emulsions are prepared as described in Example 7, using the brominated trinuclear cyanine dye of the formula (6), 333 mg, 400 mg, 467 mg, 533 mg, 600 mg and 667 mg of the dye of the formula (6) being used per 1 mol of silver halide in the emulsion.

The emulsions are adjusted to a pH value of 5.35 and a pAg value of 9.0 and are then coated onto a polyester substrate to give a thin, uniform film. The thickness of the layer is so chosen that one square meter of the layer contains 2.1 g of silver and 2.3 g of gelatine.

Exposure and developing are then carried out as described in Example 7.

Evaluation of the exposed and developed step wedge gives the following sensitometric values:

TABLE III

| Experiment No. | Cyanine dye of the formula (6) (mg/mol of silver halide) | Sensitivity ($S_{50}$) | Contrast ($\gamma$) | $D_{max}$ | $D_{min}$ |
|---|---|---|---|---|---|
| 3.1 | 333 | 1.07 | 4.2 | 3.20 | 0.01 |
| 3.2 | 400 | 1.10 | 4.2 | 3.04 | 0.01 |
| 3.3 | 467 | 1.42 | 4.2 | 3.14 | 0 |
| 3.4 | 533 | 1.73 | 4.0 | 3.10 | 0 |
| 3.5 | 600 | 1.98 | 3.6 | 3.12 | 0 |
| 3.6 | 667 | 2.30 | 2.8 | 3.12 | 0 |

Spectral sensitivity range up to 510 nm

Example 9

Direct-positive emulsions are prepared as described in Example 7, using the iodised trinuclear cyanine dye of the formula (7), 400 mg, 467 mg and 533 mg of the dye of the formula (7) being used per 1 mol of silver halide emulsion.

The resulting emulsions are coated, exposed and developed as in Example 8.

Evaluation of the exposed and developed step wedge gives the following sensitometric values.

TABLE IV

| Experiment No. | Cyanine dye of the formula (7) (mg/mol of silver halide) | Sensitivity ($S_{50}$) | Contrast ($\gamma$) | $D_{max}$ | $D_{min}$ |
|---|---|---|---|---|---|
| 4.1 | 400 | 0.41 | 2.4 | 2.68 | 0.05 |
| 4.2 | 467 | 0.41 | 1.7 | 2.68 | 0.05 |
| 4.3 | 533 | 0.56 | 2.9 | 2.34 | 0.05 |

Spectral sensitivity range up to 510 nm

Example 10

Direct-positive emulsions are prepared as described in Example 7, using the chlorinated trinuclear cyanine dye of the formula (8), 400, 467 and 533 mg of the dye of the formula (8) being used per 1 mol of silver halide in the emulsion.

The resulting emulsions are coated, exposed and processed as in Example 8.

Evaluation of the exposed and developed step wedge gives the following sensitometric values:

TABLE V

| Experiment No. | Cyanine dye of the formula (8) (mg/mol of silver halide) | Sensitivity ($S_{50}$) | Contrast ($\gamma$) | $D_{max}$ | $D_{min}$ |
|---|---|---|---|---|---|
| 5.1 | 400 | 2.18 | 2.6 | 2.60 | 0.01 |
| 5.2 | 467 | 2.23 | 2.6 | 2.72 | 0.01 |
| 5.3 | 533 | 2.33 | 2.3 | 2.60 | 0.01 |

Spectral sensitivity range up to 510 nm.

Example 11

A cubic-monodisperse emulsion of silver iodide-bromide in gelatine, in which the iodide content is 1.6 mol % and the edge length of the cubic crystals is 0.27 μm, is fogged under the same conditions as described in Example 7 with a mixture of sodium formaldehyde-sulfoxylate and auric chloride acid.

The emulsion thus obtained is divided into three portions and each portion is treated with a solution of the chlorinated trinuclear cyanine dye of the formula (10), 467 mg, 533 mg and 600 mg of the dye of the formula (10) being used per 1 mol of silver halide in the emulsion.

After adjusting the emulsions to a pH value of 5.0 and a pAg value of 9.0, they are coated in a thin, uniform layer onto a polyester substrate in the same way as described in Example 8.

Exposure and developing are then carried out as described in Example 7.

The sensitometric properties are given in Table VI below.

TABLE VI

| Experiment No. | Cyanine dye of the formula (10) (mg/mol of silver halide) | Sensitivity ($S_{50}$) | Contrast ($\gamma$) | $D_{max}$ | $D_{min}$ |
|---|---|---|---|---|---|
| 6.1 | 467 | 0.40 | 2.6 | 3.20 | 0.30 |
| 6.2 | 533 | 0.67 | 2.1 | 3.02 | 0.15 |
| 6.3 | 600 | 1.06 | 1.9 | 3.02 | 0.11 |

Example 12

A silver iodide-bromide emulsion is prepared in a manner similar to that indicated in Example 7. The emulsion is divided into five different portions and these are sensitised in accordance with Table VII below with the halogenated trinuclear cyanine dye of the formula (5) and additional proportions of the additional cyanine dye of the formula (21). The total amount of sensitiser dye is kept constant at 567 mg per mol of silver halide in the emulsion for this test series.

The emulsions sensitised in this way are each coated onto a polyester substrate to give a layer, the amount of silver being 2.0 g/m² and the amount of gelatine 2.2 g/m². After drying has taken place direct-positive photographic layers are obtained and these are exposed and developed as indicated in Example 7. The sensitometric properties are given in Table VII below.

TABLE VII

| Experiment No. | Dye of the formula (5) (mg/mol of silver halide) | Additional dye of the formula (21) (mg/mol of silver halide) | Sensitivity ($S_{50}$) | Contrast | $D_{max}$ | $D_{min}$ |
|---|---|---|---|---|---|---|
| 7.1 | 553 | 13 | 1.39 | 2.4 | 3.02 | 0.04 |
| 7.2 | 500 | 67 | 1.45 | 2.0 | 2.96 | 0.04 |
| 7.3 | 467 | 100 | 1.45 | 2.1 | 2.80 | 0.04 |
| 7.4 | 433 | 133 | 1.42 | 2.1 | 2.88 | 0.05 |
| 7.5 | 367 | 200 | 1.70 | 1.9 | 2.78 | 0.08 |

Spectral sensitivity range up to 590 nm

Example 13

A silver iodide-bromide emulsion is prepared in a manner similar to that indicated in Example 7. The emulsion is divided into seven different portions and these are sensitised in accordance with Table VIII below with the halogenated trinuclear cyanine dye (5) and additional proportions of the cyanine dye of the formula (20). The total amount of sensitiser dye is kept constant at 567 mg per mol of silver halide in the emulsion. The resulting emulsions are coated, exposed and processed as in Example 8. The sensitometric properties are given in Table VIII below.

TABLE VIII

| Experiment No. | Dye of the formula (5) (mg/mol of silver halide) | Additional dye of the formula (20) (mg/mol of silver halide) | Sensitivity ($S_{50}$) | Contrast | $D_{max}$ | $D_{min}$ |
|---|---|---|---|---|---|---|
| 8.1 | 553 | 13 | 1.81 | 1.5 | 2.72 | 0.02 |
| 8.2 | 500 | 67 | 1.84 | 1.9 | 2.76 | 0.02 |
| 8.3 | 467 | 100 | 2.00 | 1.9 | 2.66 | 0.02 |
| 8.4 | 433 | 133 | 2.05 | 1.8 | 2.58 | 0.02 |
| 8.5 | 367 | 200 | 2.10 | 1.8 | 2.70 | 0.02 |
| 8.6 | 300 | 267 | 2.05 | 2.5 | 2.78 | 0.02 |
| 8.7 | 233 | 333 | 2.10 | 2.2 | 2.66 | 0.02 |

Spectral sensitivity range up to 515 nm

Example 14

A cubic-monodisperse emulsion of silver iodide-bromide in gelatine, in which the iodide content is 1.6 mol % and the edge length of the cubic crystals is 0.27 μm, is fogged under the same conditions as described in Example 7 using a mixture of sodium formaldehydesulfoxylate and auric chloride acid. The emulsion thus obtained is divided into five portions and the brominated trinuclear cyanine dye of the formula (6) and the sensitiser dye of the formula (19) are added to each portion as indicated in Table IX below. The total amount of the two sensitiser dyes is kept constant at 567 mg per mol of silver halide in the emulsion.

After adjusting the pH value to 5.0 and the pAg value to 9.0, the emulsions are coated onto a polyester substrate in the same way as in Example 8.

Exposure and developing are then carried out as described in Example 7. The sensitometric properties are given in Table IX below.

TABLE IX

| Experiment No. | Dye of the formula (6) (mg/mol of silver halide) | Additional dye of the formula (19) (mg/mol of silver halide) | Sensitivity ($S_{50}$) | Contrast | $D_{max}$ | $D_{min}$ |
|---|---|---|---|---|---|---|
| 9.1 | 567 | 0 | 1.78 | 3.6 | 2.96 | 0.01 |
| 9.2 | 533 | 33 | 1.79 | 2.3 | 2.80 | 0.02 |
| 9.3 | 520 | 47 | 1.78 | 2.4 | 2.90 | 0.02 |
| 9.4 | 500 | 67 | 1.75 | 2.1 | 2.80 | 0.04 |
| 9.5 | 467 | 100 | 1.99 | 2.0 | 2.80 | 0.04 |

Spectral sensitivity range up to 570 nm.

Example 15

A direct-positive emulsion, the mode of action of which is based on the principle of the bleaching of a surface fog, is prepared by subjecting a cubic-monodisperse silver iodide-bromide emulsion in gelatine, the iodide content of which is 1.6 mol % and the average edge length of the cubic crystals being 0.27 μm, to chemical fogging at a temperature of 60° C. for 90 minutes. 7 ml of a 0.01% solution of sodium formaldehydesulfoxylate and 14 ml of a 0.01% solution of auric chloride acid ($HAuCl_4$) per mol of silver halide present in the emulsion are used as the fogging agent. A pH value of 8.8 and a pAg value of 6.8 are maintained during the fogging operation.

The emulsion is then divided into three portions and each portion is treated with a solution of the brominated trinuclear cyanine dye of the formula (14). 467, 533 and 600 mg respectively of the dye of the formula (14), per mol of silver halide, are used in the three portions of the emulsion. The emulsions are then adjusted to a pH value of 5.0 and a pAg value of 9.0 and finally are each coated onto a polyester substrate to give a thin, uniform film. The thickness of the layer is so chosen that one square meter of the layer contains 2.2 g of silver and 2.7 g of gelatine.

Exposure and development is carried out as described in Example 7.

Evaluation of the exposed and developed step wedge gives the following sensitometric values:

TABLE X

| Experiment No. | Cyanine dye of the formula (14) (mg/mol of silver halide) | Sensitivity $(S_{50})$* | Contrast $(\gamma)$ | $D_{max}$ | $D_{min}$ |
|---|---|---|---|---|---|
| 10.1 | 467 | 1.96 | 3.9 | 3.30 | 0.01 |
| 10.2 | 533 | 1.96 | 4.0 | 3.25 | 0.01 |
| 10.3 | 600 | 2.01 | 3.8 | 3.30 | 0.01 |

Spectral sensitivity range up to 515 nm.
*In Lux. seconds at 50% of the maximum density, $S_{50} = 3 - \log E$ (E measured in Lux. seconds).

The data show that an excellent blue-sensitivity of the direct-positive image with very low minimum densities is achieved.

Example 16

A cubic-monodisperse emulsion of silver iodide-bromide in gelatine, in which the iodide content is 1.6 mol % and the edge length of the cubic crystals is 0.23 μ, is fogged under the same conditions as described in Example 15. A pH value of 8.8 and a pAg value of 6.5 are maintained during the fogged operation.

The emulsion thus obtained is divided into 2 portions and each portion is treated with a solution of the brominated trinuclear cyanine dye of the formula (16), 533 mg and 633 mg of the dye being used per mol of silver halide in the emulsion.

The resulting emulsions are coated, exposed and processed as in Example 15. Evaluation of the exposed and developed step wedge gives the following sensitometric values.

TABLE XI

| Cyanine dye of the formula (16) (mg/mol of silver halide) | Sensitivity $(S_{50})$ | Contrast $(\gamma)$ | $D_{max}$ | $D_{min}$ |
|---|---|---|---|---|
| 533 | 0.45 | 1.8 | 3.26 | 0.33 |
| 633 | 0.60 | 1.0 | 2.66 | 0.35 |

Spectral sensitivity range up to 515 nm.

What is claimed is:

1. A direct-positive photographic material which has at least one layer which contains a silver halide emulsion, which has been surface-fogged by chemical means or by exposure, and a sensitiser, wherein the sensitiser is a trinuclear tetramethinecyanine dye having three identical heterocyclic ring systems linked to one another by three identical methine groups in which all or some of the methine hydrogen atoms have been replaced by fluorine, chlorine, bromine or iodine atoms.

2. A direct-positive photographic material according to claim 1, wherein the methine hydrogen atoms in the trinuclear tetramethinecyanine dye have been replaced by fluorine, chlorine, bromine or iodine atoms.

3. A direct-positive photographic material according to claim 1, wherein the tetramethinecyanine dye has the formula

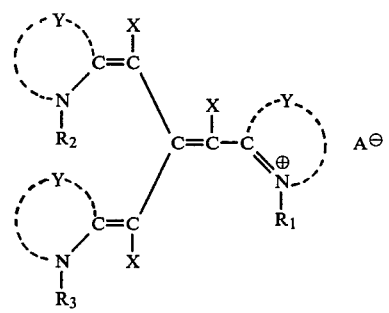

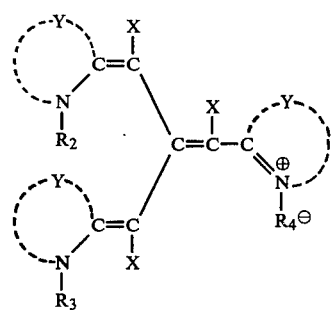

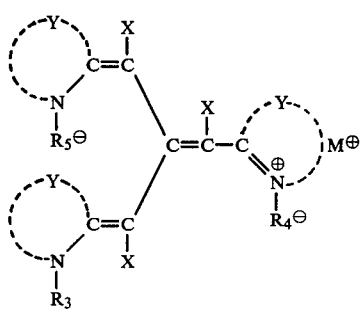

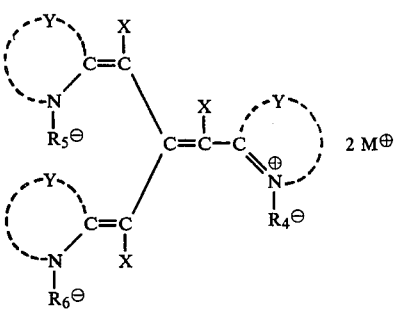

or

-continued

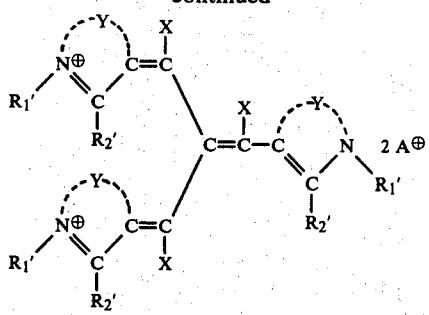

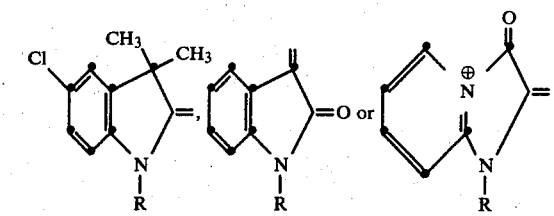

in which R is one of the radicals $R_1$ to $R_6$ defined in claim 3 and $R_7$ is alkyl having 1 to 4 carbon atoms.

7. A direct-positive photographic material according to claim 3, wherein the heterocyclic ring system has the formula in which Y is the atoms required to complete a monoheterocyclic or poly-heterocyclic ring system, $R_1$, $R_2$ and $R_3$ are each alkyl having 1 to 20 carbon atoms or alkenyl having 2 to 20 carbon atoms in the main chain, these radicals being unsubstituted or substituted by halogen, hydroxyl, cyano, alkoxy having 1 to 4 carbon atoms or carbalkoxy having 1 to 4 carbon atoms in the alkoxy radical, or aryl or aralkyl which are unsubstituted or substituted by halogen, hydroxyl, cyano, alkoxy having 1 to 4 carbon atoms, carbalkoxy having 1 to 4 carbon atoms in the alkoxy radical, alkyl, hydroxyalkyl or halogenalkyl having 1 to 4 carbon atoms or mono- or di-alkylamino, amino, carboxamido or sulfonamido groups, $R_1'$ is alkyl having 1 to 4 carbon atoms, $R_2'$ is aryl, $R_4$, $R_5$ and $R_6$ are each alkyl of 1 to 20 or alkenyl of 2 to 20 carbon atoms, aryl or aralkyl, these radicals being substituted by a carboxyl or sulfo group, X is hydrogen, fluorine, chlorine, bromine or iodine, at least one substituent X being one of the said halogen atoms, $A^\ominus$ is a monovalent anion and $M^\oplus$ is a monovalent cation.

4. A direct-positive photographic material according to claim 3, wherein one or two substituents X are fluorine, chlorine, bromine or iodine atoms.

5. A direct-positive photographic material according to claim 3, wherein all the substituents X are fluorine, chlorine, bromine or iodine atoms.

6. A direct-positive photographic material according to claim 3 wherein the heterocyclic ring system has the formula

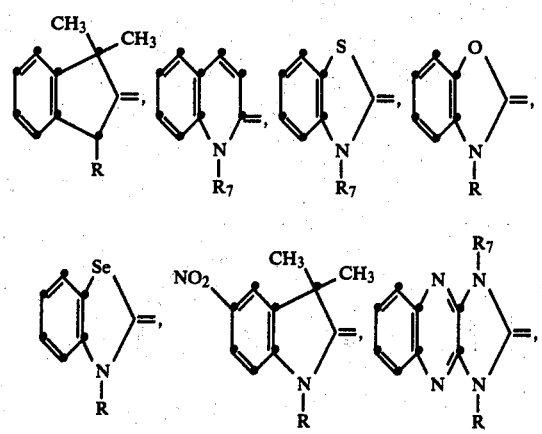

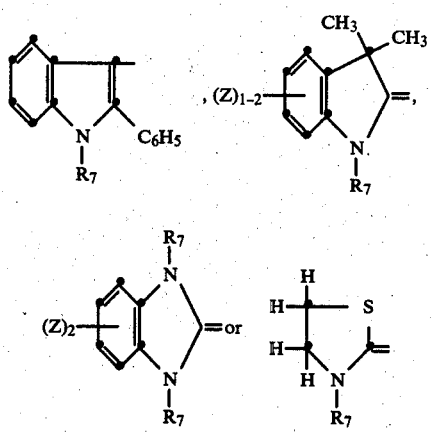

in which $R_7$ is alkyl having 1 to 4 carbon atoms and Z is fluorine, chlorine, bromine or methoxy.

8. A direct-positive photographic material according to claim 3, wherein $R_1$, $R_2$ and $R_3$ are each methyl, ethyl, n-propyl, i-propyl, n-butyl, i-butyl, allyl, methallyl, β-methoxyethyl, β-ethoxyethyl, β-hydroxyethyl, γ-hydroxypropyl, phenyl, benzyl or β-phenylethyl and $R_4$, $R_5$ and $R_6$ are each carboxymethyl, carboxyethyl, carboxypropyl, carboxybutyl, sulfoethyl, sulfopropyl, sulfobutyl, p-sulfobenzyl, carbomethoxymethyl or carbomethoxyethyl.

9. A direct-positive photographic material according to claim 5, wherein the trinuclear halogenated tetramethinecyanine dye has the formula

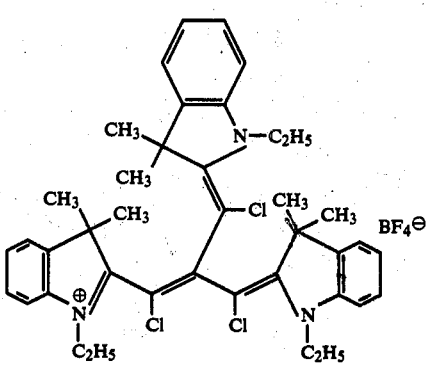

-continued
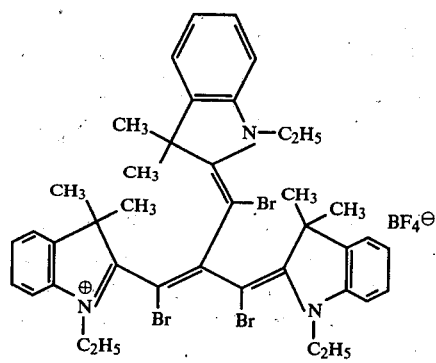
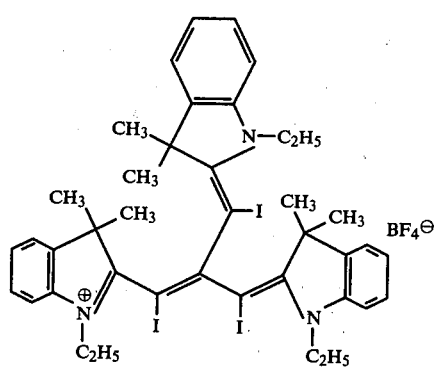
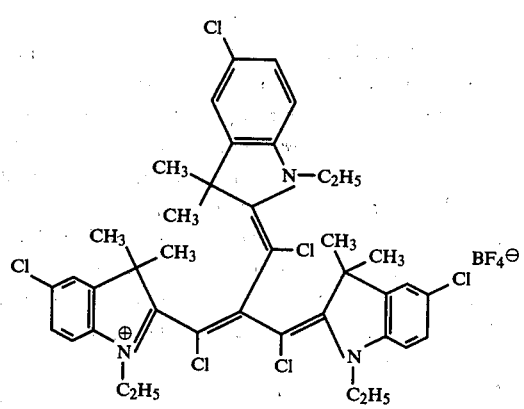
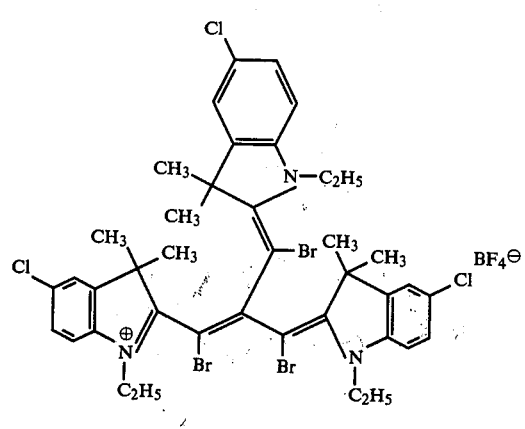
-continued
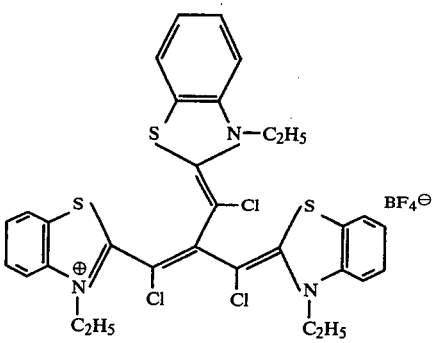
or
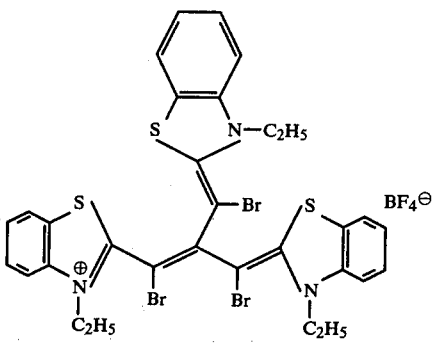
10. A direct-positive photographic material according to claim 4, wherein the trinuclear halogenated tetramethinecyanine dye has the formula
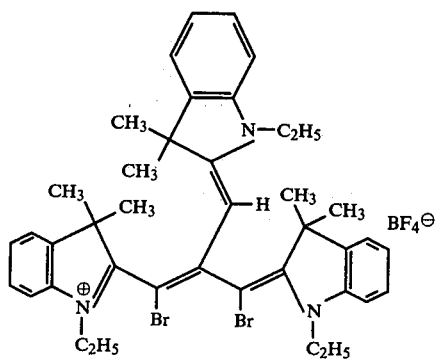
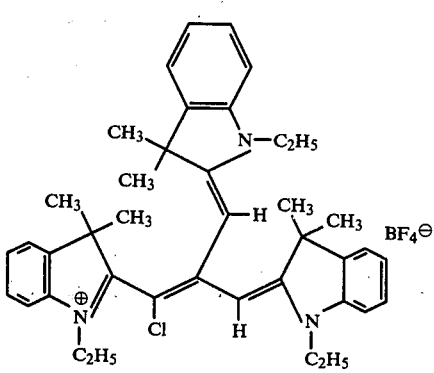

-continued

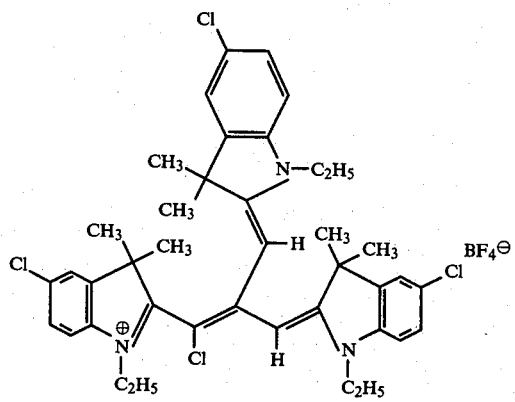

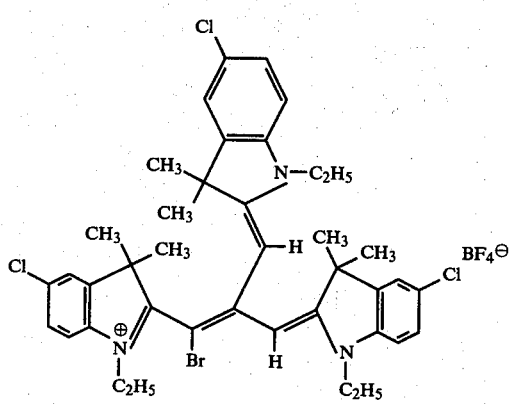

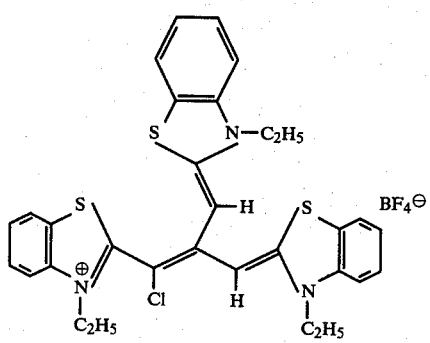

-continued

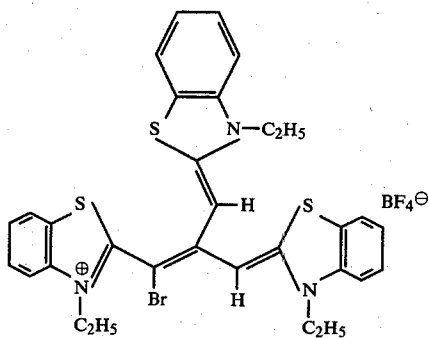

11. A direct-positive photographic material according to claim 1, which contains, in at least one light-sensitive layer containing silver halide, at least one other spectral sensitising dye in addition to the partially or completely halogenated trinuclear tetramethinecyanine dye.

12. A direct-positive photographic material according to claim 11, wherein the additional sensitising dye is an acid or basic cyanine dye which contains substituted or unsubstituted benzimidazole, benzoxazole, benzthiazole, benzselenazole, indole and/or quinoline radicals.

13. A direct-positive photographic material according to claim 12, wherein the additional sensitising dye has the formula

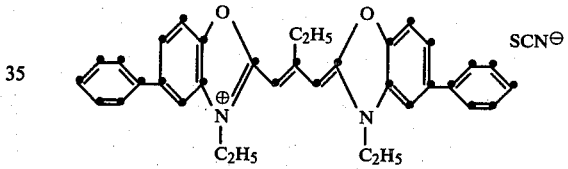

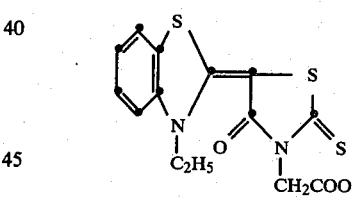

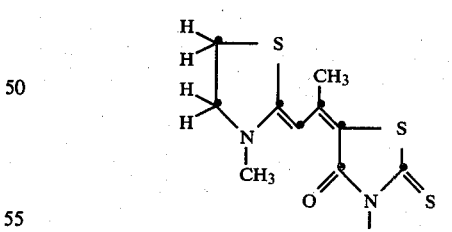

or

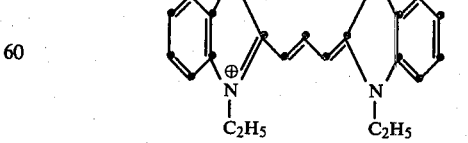

14. A process for the production of direct-positive images by imagewise exposure and development of the photographic material according to claim 1.

* * * * *